S. A. MINNICK & A. L. SMITH.
CALIPERS.
APPLICATION FILED APR. 23, 1910. RENEWED JUNE 19, 1911.
1,000,835.
Patented Aug. 15, 1911.
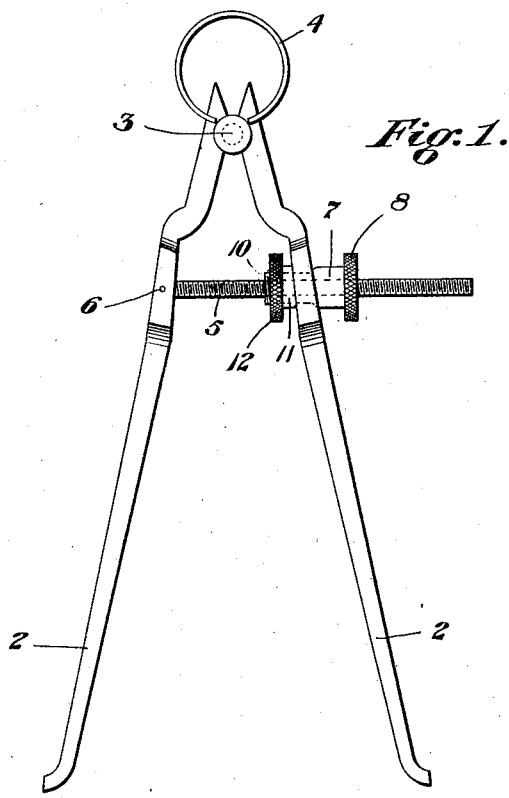
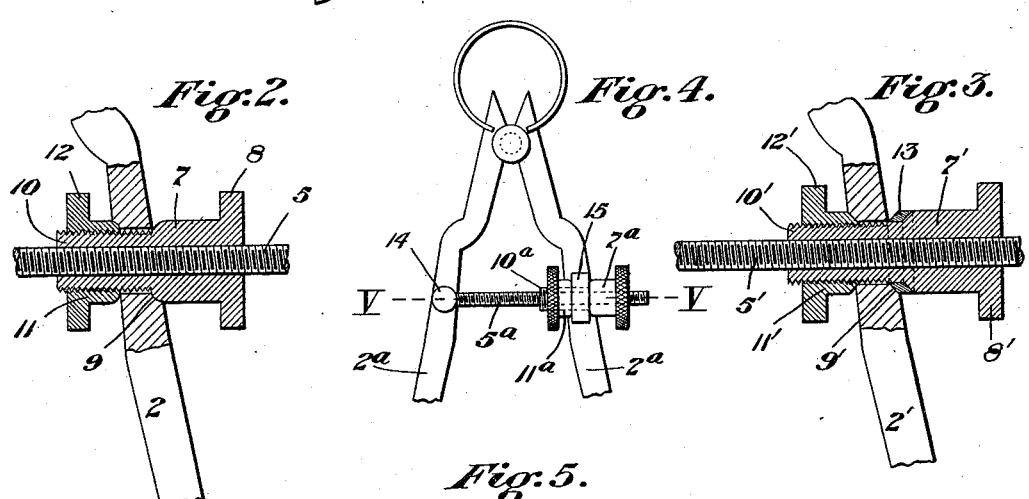

UNITED STATES PATENT OFFICE.

STEWART A. MINNICK AND ALBERT L. SMITH, OF PITTSBURG, PENNSYLVANIA, ASSIGNORS TO SAID STEWART A. MINNICK, OF PITTSBURG, PENNSYLVANIA.

CALIPERS.

1,000,835.  Specification of Letters Patent.  Patented Aug. 15, 1911.

Application filed April 23, 1910, Serial No. 557,147. Renewed June 19, 1911. Serial No. 634,112.

*To all whom it may concern:*

Be it known that we, STEWART A. MINNICK and ALBERT L. SMITH, citizens of the United States, residing at Pittsburg, in the county of Allegheny and State of Pennsylvania, have invented certain new and useful Improvements in Calipers, of which the following is a specification, reference being had therein to the accompanying drawing.

Our invention refers to improvements in calipers and more particularly to the adjusting mechanism therefor, for quickly and accurately adjusting the caliper legs and fixedly holding them in position.

The invention consists in providing the usual threaded adjusting screw with a threaded adjusting nut having a threaded terminal and an independent locking nut mounted thereon, constructed and operating in the manner more fully hereinafter described.

In the drawings:—Figure 1 represents an elevation of a caliper provided with our improvement. Fig. 2 is an enlarged sectional detail view of the operative mechanism. Fig. 3 is a similar view showing a modified construction provided with a washer ring. Fig. 4 is a partial view in elevation similar to Fig. 1, showing a modified construction. Fig. 5 is a cross section on the line V. V. of Fig. 4.

2, 2, represent the legs of a caliper of any of the well known forms, pivotally connected at 3 and provided if desired, with any suitable controlling spring 4 of the construction shown or any other, for distension or contraction of the legs.

5 is the adjusting screw for the caliper pivotally connected to one of the legs as at 6, and extending through the other or an extension thereof. Said stem is threaded for substantially its full length and is provided at the outer side of the caliper leg with an adjusting or limiting nut 7 having a knurled thumb extension 8. Said nut 7 is shouldered as at 9 providing a rounded bearing against a suitably rounded recess in the leg and is provided with a threaded extension 10, projecting inwardly beyond said shoulder, the entire nut being internally threaded and mounted upon the stem 5 in the usual manner.

11 is a supplemental locking nut provided with a knurled periphery 12 for adjustment, similar to nut 7, nut 11 being threaded upon the extension 10 and adapted to bind inwardly against the inner side of the leg 2. By this construction, upon loosening locking nut 11, nut 7 may be adjusted to any extent along threaded stem 5 either inwardly or outwardly carrying locking nut 11 with it and requiring no further manipulation thereof. When adjusting nut 7 has been actuated to set the leg 2 in propor position with relation to the other leg for exact measurement, locking nut 11 is then turned to bind the leg fixedly with relation to nut 7. It will be seen that the only independent movement imparted to locking nut 11 is to slightly turn it to locking or unlocking position, it being mounted upon the main adjusting nut and being carried with it in one direction or the other.

In Fig. 3 the parts are substantially the same as have just been described with the addition of a supplemental bearing ring or washer 13 set around the inner portion of nut 7', said washer providing an independent bearing against the recess 9' of leg 2' avoiding any undue wear or friction in adjusting the parts. The several elements of the construction shown in Fig. 3 are identified by the numerals corresponding to those of Fig. 2, primed.

In Fig. 4 the caliper legs $2^a$, $2^a$, are provided with laterally extending lugs 14 and 15 respectively pivoted to the caliper legs, for engagement of the end and body portion of the adjusting stem $5^a$. Nut $7^a$ engages said stem and lug 15 and locking nut $11^a$ engages the inner threaded end $10^a$ of the nut and also the inner side of lug 15 in the same manner as above described. The advantage of this construction is that the adjusting thumb screw nuts, being set outwardly beyond the legs permit of greater clearance between them. This construction also permits of the tool being made of stamped metal at much lower cost.

We are aware that it is not new to provide an adjusting nut and a locking nut mounted on the threaded stem itself, one at each side of the leg, but in such constructions it is necessary to set each of said nuts inwardly or outwardly to the desired extent before the calipers can be set. In our construction the adjustment of nut 7 upon the threaded stem carries with it its locking nut, avoiding any additional adjustment thereof except the slight turn necessary to bring it into or out of binding engagement to lock the parts together.

The advantages of the invention will be readily appreciated by all those familiar with this class of instruments.

The invention may be changed or varied by the skilled mechanic to adapt it to different designs or forms of calipers or other similar instruments, but all such changes are to be considered as within the scope of the following claim.

What we claim is:—

The combination with a caliper, of a threaded stem secured to one of the caliper legs and provided with an adjusting nut having an externally threaded extension, adapted to engage one side of the other leg, and a locking nut mounted on said threaded extension for engaging the other side of said other leg, substantially as set forth.

In testimony whereof we affix our signatures in presence of two witnesses.

STEWART A. MINNICK.
ALBERT L. SMITH.

Witnesses:
C. M. CLARKE,
J. F. McKENNA.

Copies of this patent may be obtained for five cents each, by addressing the "Commissioner of Patents, Washington, D. C."